(12) United States Patent
Sanders et al.

(10) Patent No.: US 9,120,224 B2
(45) Date of Patent: Sep. 1, 2015

(54) FRAMEWORK AND METHOD FOR CONTROLLING A ROBOTIC SYSTEM USING A DISTRIBUTED COMPUTER NETWORK

(75) Inventors: Adam M. Sanders, Holly, MI (US); Leandro G. Barajas, Troy, MI (US); Frank Noble Permenter, Webster, TX (US); Philip A. Strawser, Houston, TX (US)

(73) Assignees: GM Global Technology Operations LLC, Detroit, MI (US); The United States of America as Represented By The Administrator of the national Aeronautics and Space Administration, Washington, DC (US)

( * ) Notice: Subject to any disclaimer, the term of this patent is extended or adjusted under 35 U.S.C. 154(b) by 1013 days.

(21) Appl. No.: 12/564,094

(22) Filed: Sep. 22, 2009

(65) Prior Publication Data
US 2011/0071672 A1    Mar. 24, 2011

(51) Int. Cl.
*B25J 19/00*    (2006.01)
*B25J 13/00*    (2006.01)
(Continued)

(52) U.S. Cl.
CPC ............ *B25J 9/161* (2013.01); *G05B 19/4141* (2013.01); *G05B 19/4148* (2013.01); *G05B 2219/33218* (2013.01)

(58) Field of Classification Search
CPC . B25J 9/161; G05B 19/4141; G05B 19/4148; G05B 2219/33218
USPC ................................................ 700/245–264
See application file for complete search history.

(56) References Cited

U.S. PATENT DOCUMENTS

| 6,175,206 B1 | 1/2001 | Ueno et al. |
| 6,850,818 B2 | 2/2005 | Sabe et al. |

(Continued)

FOREIGN PATENT DOCUMENTS

| DE | 60012458 T2 | 7/2005 |
| JP | 02257204 | 10/1990 |

(Continued)

OTHER PUBLICATIONS http://robotics.nasa.gov/courses/fall2002/event/oct1/NASA_Robotics_20021001.htm.

*Primary Examiner* — Khoi Tran
*Assistant Examiner* — Dale Moyer
(74) *Attorney, Agent, or Firm* — Quinn Law Group, PLLC

(57) ABSTRACT

A robotic system for performing an autonomous task includes a humanoid robot having a plurality of compliant robotic joints, actuators, and other integrated system devices that are controllable in response to control data from various control points, and having sensors for measuring feedback data at the control points. The system includes a multi-level distributed control framework (DCF) for controlling the integrated system components over multiple high-speed communication networks. The DCF has a plurality of first controllers each embedded in a respective one of the integrated system components, e.g., the robotic joints, a second controller coordinating the components via the first controllers, and a third controller for transmitting a signal commanding performance of the autonomous task to the second controller. The DCF virtually centralizes all of the control data and the feedback data in a single location to facilitate control of the robot across the multiple communication networks.

17 Claims, 1 Drawing Sheet

(51) Int. Cl.
*G05B 19/414* (2006.01)
*B25J 9/16* (2006.01)
*G06F 19/00* (2011.01)

(56) References Cited

U.S. PATENT DOCUMENTS

| | | | |
|---|---|---|---|
| 6,876,903 | B2 | 4/2005 | Takenaka |
| 7,103,447 | B2 | 9/2006 | Di Profio et al. |
| 2002/0120361 | A1* | 8/2002 | Kuroki et al. .................. 700/245 |
| 2002/0188381 | A1 | 12/2002 | Bottero et al. |
| 2006/0059975 | A1 | 3/2006 | Kawaguchi et al. |
| 2007/0010898 | A1* | 1/2007 | Hosek et al. ...................... 700/2 |

FOREIGN PATENT DOCUMENTS

| | | | |
|---|---|---|---|
| JP | 07334227 | | 12/1995 |
| JP | 08293870 | A * | 11/1996 .............. H04L 12/28 |
| JP | 11331158 | A | 11/1999 |
| JP | 2000190265 | A | 7/2000 |
| JP | 2005004757 | A | 1/2005 |
| JP | 2005186234 | | 7/2005 |
| JP | 2006171960 | A | 6/2006 |
| JP | 2006197030 | A | 7/2006 |
| JP | 2006224276 | | 8/2006 |
| JP | 2008543578 | A | 12/2008 |
| JP | 2009072028 | A | 4/2009 |

* cited by examiner

FRAMEWORK AND METHOD FOR CONTROLLING A ROBOTIC SYSTEM USING A DISTRIBUTED COMPUTER NETWORK

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the control of a humanoid robot using a distributed computer network of flexible computational modules or control nodes.

BACKGROUND OF THE INVENTION

Robots are devices that are able to manipulate objects using a series of rigid links, which in turn are interconnected via articulations or actuator-driven robotic joints, e.g., electric, pneumatic, etc. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well as control over the applied torque or force, motion, and the various grasp types. In conventional industrial robot control systems, robotic hardware is continuously monitored and maintained through a single, central control unit. Such a system may perform in a progressively inefficient manner in response to increasing degrees of freedom and related control complexity.

SUMMARY OF THE INVENTION

Accordingly, a distributed control framework (DCF) is provided herein for control of a dexterous humanoid robot. The DCF utilizes a series of distributed controllers communicating over multiple high-speed networks, along with a centralized abstraction layer for centralizing and abstracting all of the control and feedback data required for control of the motion and other functions of the robot. Seamless interfacing of the robotic components allows precise control over a wide variety of compliant robotic joints and other systems, both external and internal, including the various joint servo motors and actuators providing the motive force within and between each compliant joint of the humanoid robot.

The DCF includes multiple computational control nodes, i.e., embedded printed circuit board assemblies (PCBA) or processors and external workstation computers, which automatically communicate over the different networks to control and coordinate functions of various integrated system components, e.g., joints, relays, lasers, lights, electro-magnetic clamps, etc., and to thereby control the actions of the robot. The dexterous humanoid robot has multiple synchronized joints, e.g., shoulders, elbows, neck, waist, wrists, fingers, thumbs, etc., that can move together in a synchronized manner to conduct a particular action. Such a humanoid robot can have many times the number of degrees of freedom (DOF) or directional control variables of a conventional robot. As a result, any control system attempting to coordinate and control the complex dynamic motion of such a robot must quickly process control and feedback data that is orders of magnitude greater in volume than that found in conventional robot control systems.

The DCF provided herein allows for a large amount of control and feedback data to be centralized and abstracted in a single location, referred to herein as an "abstraction layer", for easy cross-network data manipulation, storage, and retrieval. The hardware and control nodes can be dynamically configured, and robot functionality may be easily scaled, without requiring complex programming code compilation or state machine changes. That is, by decentralizing the DCF, the individual command modules may be easily introduced and removed in an ad hoc manner as needed to provide the required robotic functionality.

Within the scope of the present invention, the DCF is functionally redundant, and may operate over multiple high-speed serial buses, Ethernet, TCP/IP streams, and publish-subscribe data delivery systems. A collection of software-based network communication managers (NCM) act to coordinate and prioritize communication within the robot. If a particular command module is disconnected during a command session, the NCM may "fail soft" and revert control of the robot to a safe state, thus ensuring the safety of the robot and its operators. A disconnected command module may automatically switch to a safe state during a hardware failure, and will attempt to communicate its failure status to a higher control authority within the hierarchy of distributed controllers.

The central abstraction layer noted above may be embodied as a software-driven device encapsulating or centralizing all of the command and feedback data for the humanoid robot within a central location. Such a location may be real, i.e., a physical device such as the system commander described herein, although the location may also be "abstract" in the sense that the data may be widely distributed between the various devices of the DCF similar to the manner of Internet data distribution, with access to the information provided via the designated device.

The NCMs collectively monitor the data flowing to and from the abstraction layer from the various embedded controllers and a real-time controller or brainstem of the humanoid robot. A data router may be used with each of the different networks to maintain scheduled updates to the embedded processors that are responsible for hardware control. This central abstraction layer houses the basic control functionality of the robot, and is capable of reverting to a safe state when triggered by certain threshold events as noted above.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
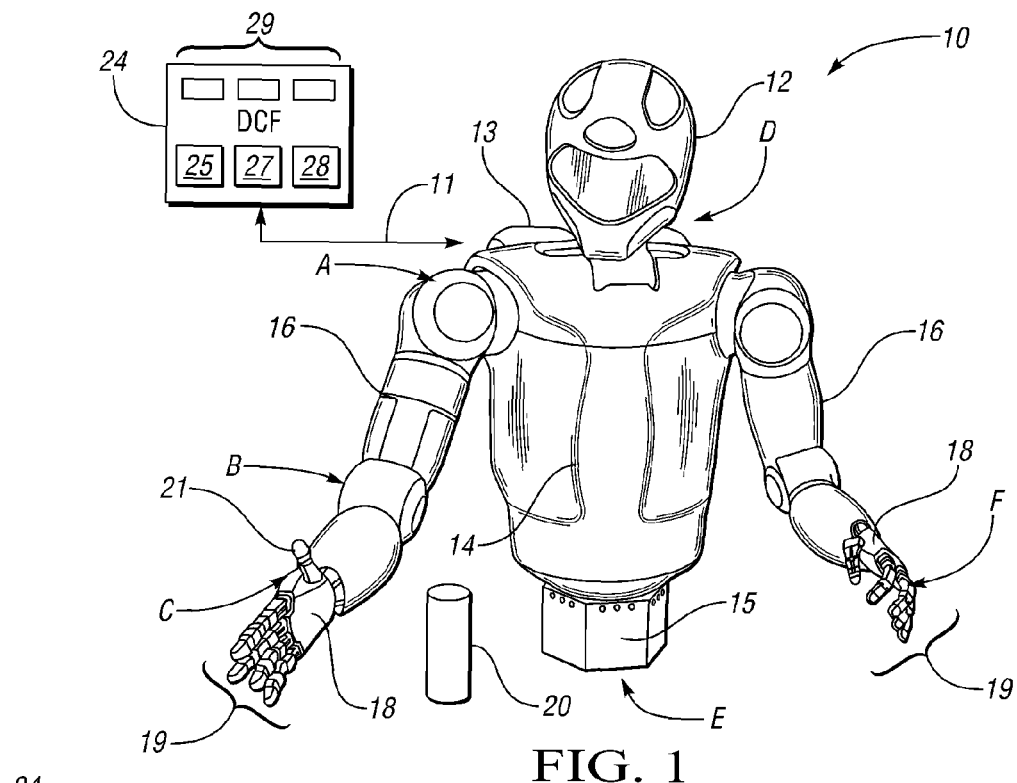
FIG. 1 is a schematic illustration of a dexterous humanoid robot and distributed control framework (DCF) in accordance with the invention.

With reference to the drawings, wherein like reference numbers refer to the same or similar components throughout the several views, FIG. 1 shows a dexterous humanoid robot 10 adapted to perform one or more tasks with multiple degrees of freedom (DOF). According to one embodiment, the robot 10 is configured with a plurality of independently and interdependently-moveable compliant robotic joints, such as but not limited to a shoulder joint (arrow A), an elbow joint (arrow B), a wrist joint (arrow C), a neck joint (arrow D), and a waist joint (arrow E), as well as the various finger joints (arrow F) positioned between the phalanges of each robotic finger 19.

Each robotic joint may have one or more DOF. For example, certain joints such as the shoulder joint (arrow A), elbow joint (arrow B), and wrist joint (arrow C) may have at least two DOF in the form of pitch and roll. Likewise, the neck joint (arrow D) may have at least three DOF, while the waist and wrist (arrows E and C, respectively) may have one or more DOF. Depending on task complexity, the robot 10 may move with over 42 DOF. Although not shown in FIG. 1 for simplicity, each robotic joint contains and is driven by one or more actuators, e.g., joint motors, linear actuators, rotary actuators, electrically-controlled antagonistic tendons, and the like.

The joints of the robot 10 are compliant, i.e., sufficiently non-stiff, due to the inclusion of springs in all of the joints, and therefore position encoders (not shown) may be used for the actuator or servo motors as well as for the joint itself, i.e., to provide information about the force being applied to the joint. Additionally, between compliant joints there may be 6-axis force torque sensors that gather complete force information on the status of a given compliant joint.

The humanoid robot 10 may include a head 12, torso 14, waist 15, arms 16, hands 18, fingers 19, and thumbs 21, with the various joints noted above being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply maybe attached through an external cable (not shown) to provide sufficient electrical energy to the various joints for movement of the same.

A distributed control framework (DCF) 24 provides precise motion and systems control of the various integrated system components of the humanoid robot 10, e.g., the various compliant joints, relays, lasers, lights, electro-magnetic clamps, and other components required for establishing precise control over the robot 10, including control over the fine and gross movements needed for manipulating an object 20 that may be grasped by the fingers 19 and thumb 21 of one or more hands 18. The DCF 24 is able to control each robotic joint in isolation from the other joints, as well as fully coordinate the actions of multiple joints in performing a more complex work task.

The DCF 24 may include multiple digital computers or data processing devices each having one or more microprocessors or central processing units (CPU), read only memory (ROM), random access memory (RAM), electrically-programmable read only memory (EPROM), a high-speed clock, analog-to-digital (A/D) circuitry, digital-to-analog (D/A) circuitry, and any required input/output (I/O) circuitry, I/O devices, and communication interfaces, as well as signal conditioning and buffer electronics. Individual control algorithms resident in the DCF 24 or readily accessible thereby may be stored in ROM and automatically executed at one or more different control levels to provide the respective control functionality.

Still referring to FIG. 1, in one embodiment the DCF 24 may include a first or upper level controller, referred to hereinafter as the system commander 25, and a second or mid-level real-time controller referred to hereinafter as the brainstem 27. The DCF 24 also includes multiple embedded joint controllers 29 which are each embedded within the robot 10 in close proximity to the joints controlled by each, as described below. Control data and feedback data, represented by double-arrow 11, is exchanged between the robot 10 and the various levels of the DCF 24, which may be expanded to include additional control levels without departing from the intended scope of the invention, to ensure precise complex motion and systems control of the robot 10. The DCF 24 abstracts and centralizes the collective data (arrow 11) in a single location to facilitate control of the humanoid robot across the multiple communication networks, as will now be described with reference to FIG. 2.

Figure 2:
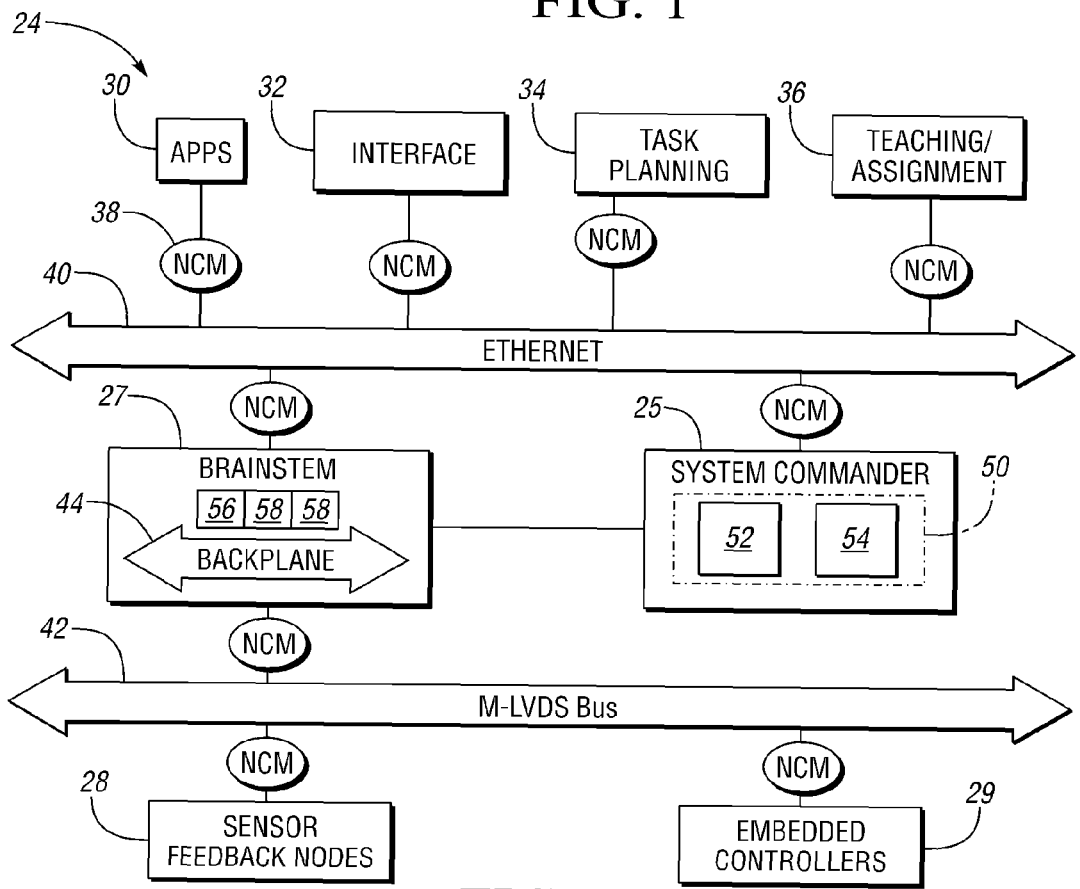
FIG. 2 is schematic data flow illustration of the DCF for controlling the dexterous humanoid robot of FIG. 1.

Referring to FIG. 2, the DCF 24 of FIG. 1 is shown in a greater level of detail. Due to the wide range of work tasks required of the dexterous humanoid robot 10, and the vastly increased control complexity thereof, the rapid processing and coordination of a relatively large amount of control and feedback data is required. The DCF 24 is therefore configured to be robust, i.e., readily modifiable to accept and work with additional control data and module command hardware and algorithms as needed.

As noted above, conventional centralized control system may not be sufficiently flexible to control a complex humanoid robot of the type shown in FIG. 1, which may have as many as 42 DOF or more depending on the complexity of the particular task being performed. Such a robot may have sensor content that is orders of magnitude greater than that processed in conventional robot controllers.

The DCF 24 thus relies on an upper-level control device or system commander 25, at least one mid-level real-time controller referred or brainstem 27, sensor feedback nodes 28, and a plurality of high-speed, low-level embedded processors or joint controllers 29. The joint controllers 29 may each be directly embedded within the structure of the robot 10 in close proximity to the joint being controlled thereby, e.g., within or near the arms 16, waist 15, and neck joint (arrow D), or within or in proximity to another integrated system component being controlled thereby.

In one embodiment the joint controllers 29 may be configured as printed circuit board assemblies (PCBA) each controlling a single degree of freedom (DOF) of a corresponding joint. For example, a joint having 3 DOF may be controlled using three joint controllers 29, each dedicated to control of one DOF, or jointly controlling all three joints when mechanical coupling exists. However, in practice other controller-DOF relationships may result. That is, within the scope of the invention there are three main types of actuators usable for moving the various joints of the robot 10: directly-driven, mechanically-coupled, and tendon-driven.

Directly-driven joints (e.g., an elbow) may have a motor that is directly connected to the joint and two encoders for resolving the state of the system, i.e., one each for the servo position and the joint itself. In this case, one controller module and actuator will drive a single joint with 1 DOF. Mechanically-coupled N-DOF joints are also possible, e.g., a wrist, where N-motors jointly control N DOF. In this case, encoders are needed in the servo motor, with N Hall-effect sensors used in the actual joint for measuring the combined resultant position of the N DOF. Finally, tendon-driven joints are possible, with such joints working in groups, e.g., three fingers 19 may be actuated using four tendons that are complementary in a 3-1 arrangement. So, in one embodiment one tendon may open all fingers 19 while the other three tendons act to close the individual fingers. This principle extends to individual fingers, phalanges, or phalanges groups, and can also control different DOFs of a group or fingers. For example, in a 2-2 arrangement we could simultaneously control two fingers in 2 DOF. In such a case, four controllers may jointly control 2 DOF and two finger/phalanges simultaneously.

The wrist joint (arrow C) may have 2 DOF that are jointly controlled by two ball screws providing coupled control of the complex joint. If both ball screws are actuated forward the wrist joint will move down, and vice versa. If only one ball screw is actuated, or if the ball screws are actuated in different directions depending on the current position, the wrist joint will move to either the left or the right. It should be clear that the combination of these two actions can produce a range of motion in both DOF. The DCF 24 also includes various command modules 30, 32, 34, and 36 located external to the robot, each of which will be described below. The command modules provide stringent data flow and timing control ensuring proper routing and control to the robot 10 response to the host of sensors and actuators needed by the robot 10, as described above.

In addition to the above devices, the DCF 24 includes a collection of network communications managers (NCM) 38 configured to prioritize the communication between a given network and a device within the DCF. As will be understood by those of ordinary skill in the art, NCM 38 may include software that provides a programming interface to the particular hardware device attempting to connect to a network, ensuring the device may properly connect according to the particular communications protocol used by the network.

The DCF 24 also includes a centralized abstraction layer 50 which may be used to control the robot 10 and any related automation devices, e.g., conveyors, programmable logic controllers, and the like. Abstraction layer 50 may include a database or database management system (DBMS) 52 and data routing and management (DRM) software 54 providing fail-soft connections between the various command modules. Control and feedback data relayed to and from the robot 10 is centralized within the DBMS 52, which may be configured as a single database or multiple databases.

As noted above, the abstraction layer 50 is "abstract" in the sense that access to the data may be provided at a single source, for example the system commander 25, while the data itself may be distributed throughout the various devices of the DCF 24, much like the way information on the Internet is widely distributed to different devices. Such centralized control data allows hardware and control nodes, e.g., the command modules 30-36, to be dynamically configured, and for robot functionality to be easily scaled.

Within the abstraction layer 50, the DRM software 54 centralizes or encapsulates all of the command and feedback data for the robot 10 and each NCM 38 monitors the flow of data to and from the abstraction layer. A data router (not shown) in each network maintains scheduled updates to the various devices connected thereto. Abstraction layer 50 also houses the most basic control functions of the robot 10, and is capable of reverting the entire DCF 24 to a safe state when triggered by certain threshold events.

Still referring to FIG. 2, a plurality of command modules, such as the modules 30-36, may be connected to the abstraction layer 50 via an NCM 38 and multiple networks. In one embodiment, the networks may include an Ethernet or Ethernet IP connection 40, a multipoint low-voltage differential signaling (M-LVDS) Bus 42, and a cPCI backplane 44, respectively, although other buses and/or computer networks may also be used within the intended scope of the invention.

In the embodiment of FIG. 2, the command modules 30-36 are each connected to an NCM 38, and through the NCM to a network, e.g., Ethernet 40. Each command module may have a dedicated top-level function. In one embodiment, the command module 30 may be configured for control of certain peripheral sensory applications, e.g., haptic or touch-based sensing module, and/or a vision sensing module providing laser, radar, and/or optical-based visual perception capability. Other modules may include a sound or voice-based sensing module, e.g., speech or sound recognition, a user interface module providing user access to the robot 10, a task planning module, a tele-operation module, a reasoning module and/or a learning module for training of the robot, and/or any other module providing the desired functionality.

Command module 32 may be configured as a user interface, e.g., a control panel or other human-machine interface (HMI) device. Module 32 may be configured to separately facilitate access to the robot 10 at the operational and the programming levels. To that end, module 32 may include a graphical user interface (GUI) providing an operator with an intuitive or menu-driven set of functional options for limited control over the robot 10. Module 32 may also include a restricted interface providing programming access to the robot 10 by engineers, programmers, or other designated personnel having the authority to alter the core control code of the robot.

Robot task planning may reside in the command module 34. For example, automated and/or autonomous tasks may be programmed in command module 34. Certain applications of the robot 10 may involve telepresence or tele-operations where sensory devices worn by a human operator may be used to see, feel, hear, or otherwise sense the respective sensations experienced by the robot 10, and to likewise command the robot with specific movements. Likewise, task assignment and learning functionality may be resident on the module 36. Functionality resident on command module 36 may include training and/or learning mode software allowing the robot 10 to be trained, either by physically moving the robot through a desired motion, teaching the robot using a mathematical model or software planning, hybrid teaching, i.e., telling the robot what to do, allowing the robot to do it, correcting the robot, and repeating the sequence until perfected, or imitation/demonstration methods. Logical reasoning functionality may be part of a learning mode, or may be executed as a separate mode.

The DCF 24 also includes various sensor feedback nodes 28, e.g., signals collection nodes pertaining to measured rotation, position, speed, torque, or other values from joint sensors within the robot 10. The sensor feedback nodes 28 are connected to a network, e.g., the M-LVDS bus 42, via an NCM 38. Embedded hardware or joint controllers 29 may be configured as printed circuit board assemblies (PCBA) and locally embedded within the robot 10 in proximity to the joint being controlled, such as within the arms 16, torso 14, head 12, etc. As with the sensor feedback nodes 28, the controllers 29 are connected to a network, e.g., the M-LVDS bus 42, via an NCM 38.

Central to overall control of the robot 10 is the real-time controller or brainstem 27. The device may be positioned deep within the torso 14 of the robot 10, and may be electrically connected to the system commander 25 and each of the embedded controllers 29. Each module 56 may be dedicated to the control of one or more joints or movements, depending on the particular configuration and use of the modules 56. One of the networks of the DCF 24 can be the backplane 44, a device which may be positioned within the brainstem 27. Different brainstem modules (M) 56 connect to the backplane 44, and to an NCM 38 using a communications module 58 to the other networks, e.g., Ethernet 40 and M-LVDS bus 42.

Functionally, the brainstem 27 via its modules 56 provides reactive commands to the embedded controllers 29 in response to top-level commands from the system commander 25. The brainstem 27 includes low-level control functions, and vital functions such as power regulation. The brainstem 27 may prioritize actions of the robot 10, each of which may be assigned a required control or communications speed, e.g., 400 Hz, 200 Hz, 1 Hz. Higher-priority actions, such as those intended to prevent overheating or damage of the robot 10, may take precedence over other commands, and may be conducted at a higher speed. Tasks may be reprioritized, and modules 58 replaced or updated on an ad hoc basis, as explained below.

By way of example, the system commander 25 may issue a command to the brainstem 27 to move the elbow joint (arrow B) a certain number of degrees at a particular speed in response to a threshold event. The particular control requirements for executing this action are not known by the system commander 25. Instead, these requirements reside within the brainstem 27.

The brainstem 27, now in receipt of the immediate task to be performed, and aware of the other tasks required of the robot 10 and their associated priorities along with the current state of the system, issues a command to as many of the required embedded controllers 29 as needed to affect the required motion. The embedded controllers 29 control their associated hardware, e.g., joint motors, linear actuators, etc., to achieve the requested result, and report back to the brainstem 27 when the action is completed. In turn, the brainstem 27 informs the system commander 25 when the requested task has been completed.

If a command module 30-36 or a module 56 or 58 of the brainstem 27 is disconnected during a particular command session, the DCF 24 may "fail soft" and revert control of the robot 10 to a safe state to ensure the safety of the robot and its operators. A disconnected command module will automatically switch to a safe state during a failure of the robot 10, and will attempt to communicate that failure to a higher control authority in the hierarchy of controllers. That is, a failure at the joint level may be relayed to the system commander 25 via the brainstem 27, or a failure at the brainstem will be relayed to the system commander, so that an appropriate safe state may be entered.

While the best modes for carrying out the invention have been described in detail, those familiar with the art to which this invention relates will recognize various alternative designs and embodiments for practicing the invention within the scope of the appended claims.

The invention claimed is:

1. A robotic system operable for performing an autonomous task, the robotic system comprising:
   a humanoid robot having a plurality of integrated system components, including a plurality of compliant robotic joints, actuators adapted for moving the robotic joints, and sensors adapted for measuring feedback data of the integrated system components including the plurality of joints; and
   a multi-level distributed control framework (DCF) adapted for controlling the integrated system components over multiple high-speed communication networks, including a backplane, the DCF including:
      a plurality of first controllers each configured as a joint controller operable for processing the measured feedback data within a corresponding one of the integrated system components, such that each of the first controllers controls a single degree of freedom (DOF) of the robot, wherein each of the plurality of joint controllers is embedded in the humanoid robot in close proximity to a respective one of the robotic joints;
      a second controller in the form of a brainstem having a plurality of modules connected to the backplane, wherein the brainstem, via the modules, provides reactive commands to the first controllers to command performance of the autonomous task in response to top-level commands, and prioritizes actions of the robot for the autonomous task by assigning a required communications speed to each of the actions and
      a third controller in the form of a system commander that is adapted for transmitting the top-level commands to the second controller as a signal, thereby commanding performance of the autonomous task;
      wherein the DCF centralizes and abstracts control data to, and the feedback data from, the integrated system components in a single logical location such that access to the centralized control data is provided only via the system commander to facilitate control of the humanoid robot across the multiple high-speed communication networks.

2. The robotic system of claim 1, wherein at least one of the robotic joints includes a servo motor, and wherein the control and feedback data includes a positional value of the servo motor.

3. The robotic system of claim 1, wherein the multiple high-speed networks include each of: an Ethernet network, the backplane, and a multipoint low-voltage differential signaling (M-LVDS) bus.

4. The robotic system of claim 1, wherein each of the plurality of first controllers includes a printed circuit board assembly (PCBA) controlling one degree of freedom (DOF) of a corresponding one of the robotic joints.

5. The robotic system of claim 1, wherein the second controller includes a communications module adapted for interfacing with each of the plurality of first controllers.

6. The robotic system of claim 1, further comprising a plurality of network communication managers (NCM), wherein at least one NCM is connected to each of the high-speed communication networks and adapted to coordinate and prioritize communication between the networks.

7. A distributed control framework (DCF) for motion control of a humanoid robot having a plurality of integrated system components including a plurality of compliant robotic joints, actuators adapted for moving the robotic joints, and sensors adapted for measuring feedback data of the integrated system components, the DCF comprising:
   a plurality of different high-speed communication networks including a backplane;

a plurality of first controllers each embedded as a joint controller in the robot in close proximity to a respective one of the robotic joints and configured for processing the measured feedback data from a corresponding one of the integrated system components, wherein each joint controller controls a single degree of freedom (DOF) of the robot;

a second controller in the form of a brainstem having a plurality of modules connected to the backplane, wherein the brainstem, via the modules, provides reactive commands to the joint controllers to command a performance of an autonomous task in response to top-level commands, and prioritizes actions of the robot for the autonomous task by assigning a required communications speed to each of the actions; and a third controller in the form of a system commander that is adapted for transmitting the top-level commands to the second controller as a signal commanding performance of the autonomous task to the second controller;

wherein the DCF abstracts and centralizes control data to, and the feedback data from, the integrated system components in a single location such that access to the centralized control data is provided only at the system commander to facilitate control of the humanoid robot across the high-speed communication networks.

8. The DCF of claim 7, further comprising a plurality of network communication managers (NCM), wherein an NCM is connected to each of the networks and adapted to coordinate and prioritize communication between the networks.

9. The DCF of claim 8, wherein each NCM is configured to revert control of the robot to a safe state in response to a predetermined event.

10. The DCF of claim 9, including a plurality of command modules connected to each of the high-speed networks, and adapted for controlling a designated function of the robot, wherein the predetermined event occurs when one of the command modules is disconnected.

11. The DCF of claim 10, wherein the plurality of command modules includes at least one of: a haptic sensing module, a vision sensing module, a user interface module, a task planning module, a tele-operation module, reasoning module, and a learning module.

12. The DCF of claim 10, wherein at least some of the first controllers are configured as printed circuit board assemblies that are embedded in a respective one of the robotic joints, and that are adapted for controlling the motion of a corresponding one of the joints.

13. The DCF of claim 7, wherein the plurality of different high-speed communication networks include at least one of: an Ethernet network, the backplane, and an multipoint low-voltage differential signaling (M-LVDS) bus.

14. The DCF of claim 7, wherein each of the plurality of first controllers include a printed circuit board assembly (PCBA) controlling the single degree of freedom (DOF) of a corresponding one of the robotic joints.

15. The DCF of claim 7, wherein the second controller includes a communications module adapted for interfacing with each of the plurality of first controllers.

16. A method of controlling motion of a humanoid robot having a plurality of integrated system components including a plurality of compliant robotic joints, actuators adapted for moving the robotic joints via control data, and sensors adapted for measuring feedback data of the integrated system components, the method comprising:

embedding each of a plurality of first controllers in a respective one of the plurality of integrated system components such that each of the first controllers acts as a joint controller which controls a single degree of freedom (DOF) of the robot;

coordinating a function of the integrated system components using a second controller in the form of a brainstem, wherein the second controller is in communication with each of the plurality of first controllers and includes a plurality of modules each connected to the backplane, wherein the brainstem, via the modules, provides reactive commands to the first controllers to command performance of an autonomous task in response to top-level commands, and prioritizes actions of the robot for the autonomous task by assigning a required communications speed to each of the actions;

commanding execution of an autonomous task by transmitting the top-level commands, as a signal, to the second controller from a third controller in the form of a system commander; and centralizing and abstracting control data to, and the feedback data from, the integrated system components in a single logical location such that access to the centralized control data is provided only via the system commander to facilitate control of the robot across multiple communication networks.

17. The method of claim 16, wherein embedding each of a plurality of first controllers in a respective one of the plurality of integrated system components includes embedding a printed circuit board assembly (PCBA) in each of the robotic joints.

* * * * *